United States Patent
Kim et al.

(10) Patent No.: US 10,454,842 B2
(45) Date of Patent: Oct. 22, 2019

(54) METHOD AND APPARATUS FOR ISSUING AND GETTING ACCESS TOKEN OF DEVICE

(71) Applicant: SAMSUNG ELECTRONICS CO., LTD., Suwon-si, Gyeonggi-do (KR)

(72) Inventors: Hee-Dong Kim, Namyangju-si (KR); Heui-Sam Kwag, Suwon-si (KR); Soon-Hyung Gwon, Seongnam-si (KR); Kyoung-Han Park, Suwon-si (KR); Gye-Young Lee, Seoul (KR); Jong-Woo Lee, Seongnam-si (KR); Dong-Yun Hawng, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 166 days.

(21) Appl. No.: 15/274,210

(22) Filed: Sep. 23, 2016

(65) Prior Publication Data

US 2017/0093743 A1 Mar. 30, 2017

(30) Foreign Application Priority Data

Sep. 24, 2015 (KR) ........................ 10-2015-0135810

(51) Int. Cl.
| | |
|---|---|
| *G06F 13/00* | (2006.01) |
| *H04L 12/911* | (2013.01) |
| *H04L 29/08* | (2006.01) |
| *H04L 12/28* | (2006.01) |

(52) U.S. Cl.
CPC .......... *H04L 47/70* (2013.01); *H04L 12/2809* (2013.01); *H04L 67/12* (2013.01); *H04L 67/16* (2013.01); *H04L 67/303* (2013.01)

(58) Field of Classification Search
CPC .............. H04L 29/06; H04L 29/08072; H04L 29/0809; H04L 29/08144; H04L 63/08; H04L 12/2809; H04L 47/70; H04L 67/12; H04L 67/16; H04L 67/303; G06F 17/3089; G06F 13/00; G06Q 10/10
USPC ........................................................ 709/225
See application file for complete search history.

(56) References Cited

U.S. PATENT DOCUMENTS

| | | | |
|---|---|---|---|
| 7,870,261 B2 | 1/2011 | Baba et al. | |
| 8,151,280 B2 | 4/2012 | Sather et al. | |
| 8,667,076 B2 | 3/2014 | Walter et al. | |
| 2002/0029256 A1* | 3/2002 | Zintel ................. | H04L 12/2803 709/218 |
| 2004/0199661 A1 | 10/2004 | Murdock | |
| 2005/0240758 A1 | 10/2005 | Lord et al. | |
| 2012/0233356 A1 | 9/2012 | Nishio | |
| 2014/0002247 A1 | 1/2014 | Harrison et al. | |
| 2014/0007187 A1 | 1/2014 | Harrison | |
| 2014/0195690 A1 | 7/2014 | Harrison et al. | |

* cited by examiner

*Primary Examiner* — Robert B Harrell
(74) *Attorney, Agent, or Firm* — Nixon & Vanderhye P.C.

(57) ABSTRACT

A method for issuing an access token of a device by a control point is provided. The method includes transmitting a search request message to the device, receiving, from the device, a search response message including first information indicating a type of the device, requesting access token issuance to the device using first information and second information, the second information including additional information about the device, and receiving the access token from the device. The second information may include model information about the device.

18 Claims, 11 Drawing Sheets

METHOD AND APPARATUS FOR ISSUING AND GETTING ACCESS TOKEN OF DEVICE

CROSS-REFERENCE TO RELATED APPLICATION

This application is based on and claims priority under 35 U.S.C. § 119 to a Korean patent application filed in the Korean Intellectual Property Office on Sep. 24, 2015 and assigned Serial No. 10-2015-0135810, the disclosure of which is incorporated by reference herein in its entirety.

TECHNICAL FIELD

The present disclosure relates generally to a home network system, and for example, to a procedure for issuing an access token in each of devices connected to each other by universal plug and play (UPnP), a method for providing a user interaction guide to support the access token issuance procedure, and an apparatus supporting the method and the access token issuance procedure.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Universal plug and play (UPnP) is a collection of computer network protocols distributed by the UPnP Forum. UPnP is designed to allow interruption-free access and simplify networking in home and business environments (for example, for data sharing, communications, and entertainment). Also, the objectives of UPnP are achieved by defining and publicizing device control protocols conforming to open, Internet-based communication standards.

However, if a device connected by UPnP is registered and controlled by any device, problems may occur. Accordingly, to control the device, the authority to control the device is needed.

The above information is presented as background information only to assist with an understanding of the present disclosure. No determination has been made, and no assertion is made, as to whether any of the above might be applicable as prior art with regard to the present disclosure.

SUMMARY

Accordingly, an aspect of the present disclosure is to address at least the above-mentioned problems and/or disadvantages and to provide a method for issuing an access token of a device by a control point.

Another aspect of the present disclosure is to provide a method for issuing an access token by a device.

Another aspect of the present disclosure is to provide an apparatus for getting an access token of a device issued.

Another aspect of the present disclosure is to provide a device for issuing an access token.

In accordance with an example aspect of the present disclosure, a method for issuing an access token of a device by a control point is provided. The method includes transmitting a search request message to the device, receiving, from the device, a search response message including first information indicating a type of the device, requesting access token issuance from the device using first information and second information, the second information comprising additional information about the device, and receiving the access token from the device. The second information may include model information about the device.

In accordance with another example aspect of the present disclosure, a method for issuing an access token by a device is provided. The method includes receiving a search request message, transmitting a search response message including first information indicating a type of the device, receiving a request for issuing the access token of the device using the first information and second information, the second information comprising additional information about the device, and issuing the access token of the device, if the request for issuing the access token of the device is based on model information about the device.

In accordance with another example aspect of the present disclosure, an apparatus for getting an access token of a device issued is provided. The apparatus includes a transceiver configured to transmit and receive messages, and a controller configured to control transmission of a search request message to the device, to control reception of a search response message including first information indicating a type of the device from the device, to request access token issuance to the device using first information and second information, the second information comprising additional information about the device, and to control reception of the access token from the device. The second information may include model information about the device.

In accordance with another example aspect of the present disclosure, a device for issuing an access token is provided. The device includes a transceiver configured to transmit and receive messages, and a controller configured to control reception of a search request message requesting search for the device, to control transmission of a search response message including first information indicating a type of the device, to control reception of a request for issuing the access token of the device using the first information and second information, the second information including additional information about the device, and to control issuance of the access token of the device, if the request for issuing the access token of the device is based on model information about the device.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects and features of certain example embodiments of the present disclosure will be more apparent from the following detailed description, taken in conjunction with the accompanying drawings, in which like reference numerals refer to like elements, and wherein.

DETAILED DESCRIPTION

Figure 1:
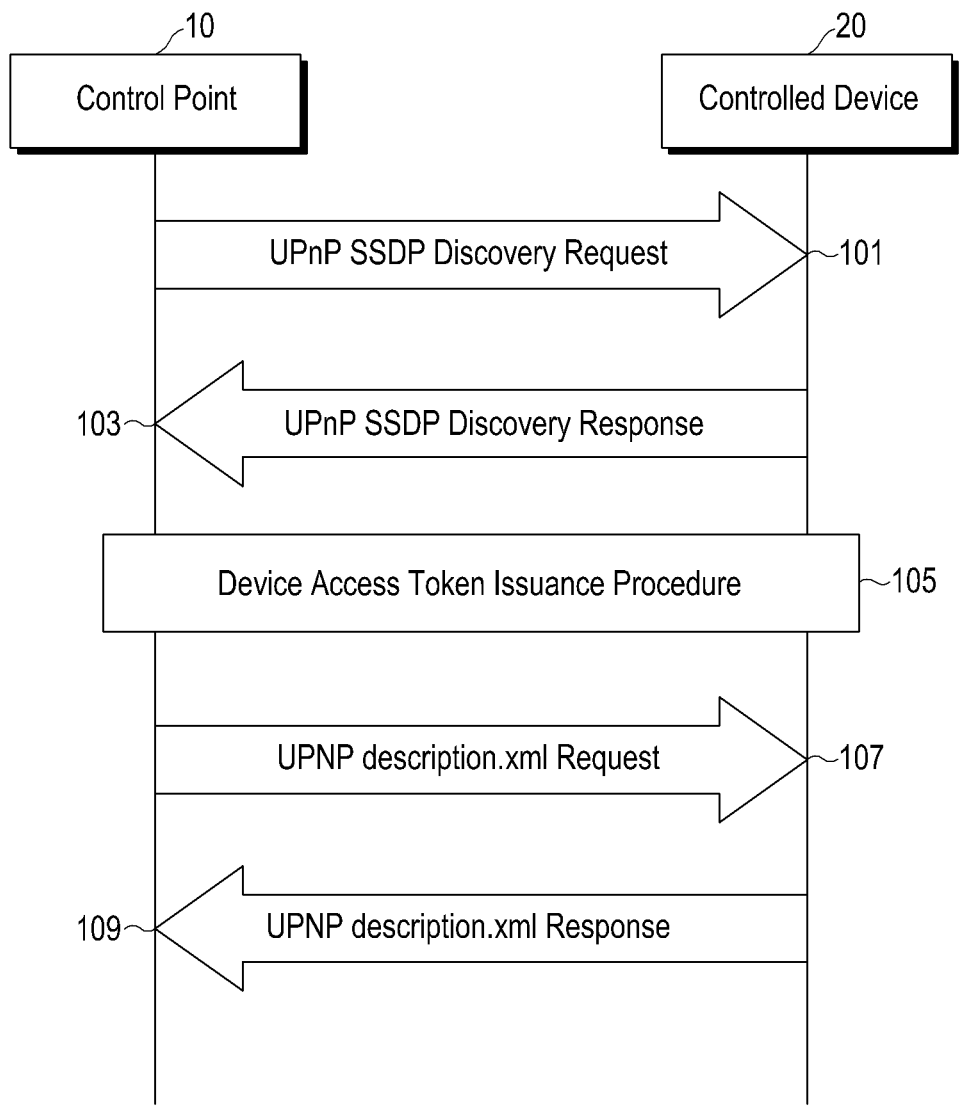
FIG. 1 is a diagram illustrating an example signal flow for an operation for getting an access token issued, using simple information about a device by a control point.

Example embodiments of the present disclosure will be described in greater detail with reference to the attached drawings. A detailed description of known functions or constructions may be omitted if it obscures the subject matter of the present disclosure. Terms used herein are defined in consideration of functions according to the present disclosure and may be changed according to the intention of a user or an operator, or customs. Therefore, the definition should be made based on the comprehensive contents of the present disclosure.

Universal plug and play (UPnP) technology is available to a wide range of devices in a home network. UPnP is a mechanism divided largely into the steps of discovery, device description, control, eventing, and presentation.

In the discovery step, a control point (CP) (a client intending to use a service of a device) searches for services of a device, and the services of the device announce their existence to the control point. In the discovery step, the simple service discovery protocol (SSDP) is used.

In the device description step, the CP makes a description document request to a device discovered in the discovery step. The description document is expressed in extensible markup language (XML) and may include vendor-specific information and manufacturer information like a model name, a model number, a serial number, a manufacturer name, uniform resource locators (URLs) to vendor-specific Web sites, and so on.

In the control step, the CP may transmit a command to a service of the device. For example, the CP may transmit a control message to the control URL of the service. The control message may be expressed in XML using the simple object access protocol (SOAP).

In the eventing step, when a variable indicating the state of the service changes, the service of the device indicates the change of the variable to the CP by an event message. The event message is expressed in XLM using the general event notification architecture (GENA) protocol.

In the presentation step, the CP allows a user to control the device or view a state of the device.

With the UPnP technology, although they are not a physically single device, devices connected to an Internet protocol (IP) network may communicate with each other so that a function of each device may be exposed to other devices on the network and freely used by the other devices. For example, if a TV uses the functionality of a smartphone on a network, the TV may serve as a smart TV. Besides, a refrigerator or a washing machine may implement a user interface (UI) such as a high-performance display, using a tablet function on the network, although it actually does not have a display. As a UPnP device with a new functionality is added to a home network, existing devices use the new function, thus naturally extending the functionalities of the entire devices. However, for functionality extension, an authority to control the device should be granted to the other devices.

Terms used in the present disclosure will be described below.

In the present disclosure, a device may refer, for example, to a component of, for example, a home network system. For example, the device may be a device having an IP address inside or outside of a home, such as a refrigerator, a washing machine, an air conditioner, a TV, or a lighting. The device may also be called a controlled device (CD) in the sense that it may be controlled by a CP.

The CP may control the functionality of the device. To control the functionality of the device, the CP should first acquire an authority to control the device from the device. To acquire the authority to control the device, the CP should get an access token issued from the device. The functionality of the CP may be executed by an application installed in a smartphone or a tablet, or the like, but is not limited thereto. The device having the application installed in it may be referred to as a client distinguishably from a device.

A user interaction guide may refer, for example, to a guide to an operation to be performed by a user. For example, the CP may provide a user interaction guide to a user in order to acquire an authority to control a device in the present disclosure. For example, the user interaction guide may refer, for example, to guiding the user to a button which should be pressed to grant the authority to control the device to the CP.

Simple information about a device, as mentioned in the present disclosure, includes information about the type of the device. For example, information indicating whether the device is a refrigerator, a washing machine, or an air conditioner may correspond to simple information about the device. The simple information about the device is known mainly in the discovery step of the UPnP technology. Detailed information or specifics about the device may refer, for example, to the model name, model number, serial number, and so on of the device, known mainly in the device description step of the UPnP technology.

Now, a description will be given of an example embodiment of the present disclosure.

FIG. 1 is a diagram illustrating an example signal flow for an operation for getting an access token issued, using simple information about a device by a CP. For example, the operation of FIG. 1 may correspond to the case where the same access token issuance procedure of the device is used irrespective of detailed information about the device.

A CP 10 transmits a UPnP SSDP discovery request message to a device, e.g., a controlled device, 20 in operation 101. For example, the CP 10 may multicast a search request message (for example, a UPnP Method-search (M-search) request message) to discover a device connected to a local network.

The device 20 transmits a UPnP SSDP discovery response message to the CP 10 in response to the UPnP discovery request message in operation 103. Operations 101 and 103 may be collectively referred to as an 'SSDP procedure'. For example, the device 20 connected to the local network unicasts an M-search response message including simple information about the device 20. Alternatively, the device 20 may transmit a notify message (a message used for notification from the device to the CP) including the simple information about the device 20 irrespective of the M-search request message.

The CP 10 may acquire the simple information about the device 20 in the SSDP procedure. However, the SSDP procedure does not provide detailed information about the device 20.

The CP 10 may get an access token of the device 20 issued, using the simple information about the device 20 in operation 105. For example, if the procedure for issuing the access token of the device 20 is based on the simple information about the device 20 irrespective of the detailed information about the device 20, the CP 10 may get the access token of the device 20 issued by providing a user interaction guide for the access token issuance procedure of the device 20 to a user.

The CP 10 which has acquired the issued access token of the device 20 may access resources representing the detailed information about the device 20. For example, the CP 10 may unicast a UPnP device description request requesting the detailed information about the device 20 to the device 20, using the simple information about the device 20 in operation 107. For example, the CP 10 may acquire location information about the device 20 as simple information about the device 20 by the SSDP procedure. The location information may be expressed as a URL. The CP 10 may request the detailed information about the device 20 using the location information about the device 20.

Once the CP 10 gets the access token of the device 20 issued, the device 20 responds to the CP 10 with a UPnP device description response in operation 109. The detailed information may include vendor-specific information about the device 20.

Figure 2:
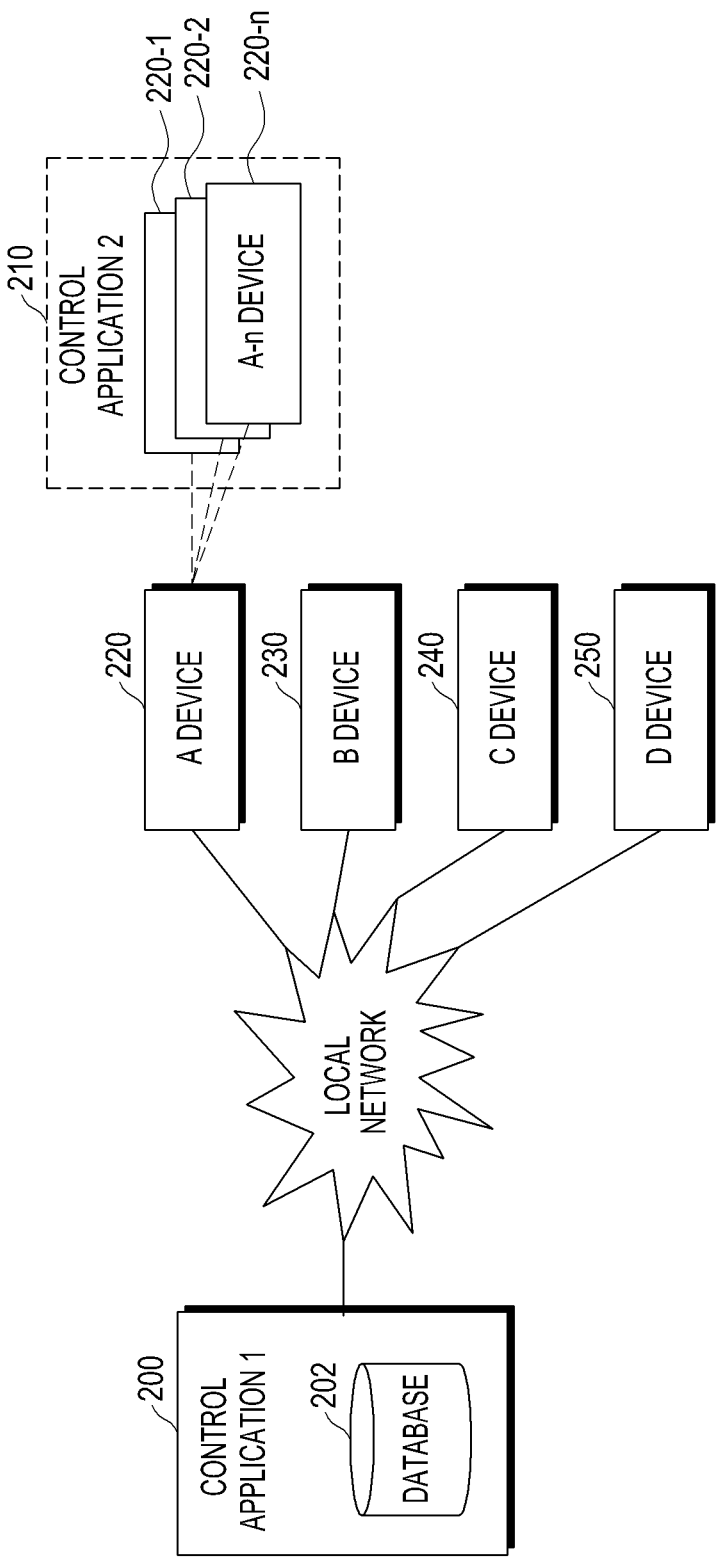
FIG. 2 is a diagram illustrating an example of availability of a user interaction guide for an access token issuance procedure of a device, based on the device.

FIG. 2 is a diagram illustrating an example of availability of a user interaction guide for an access token issuance procedure of a device, based on the device.

A first control application (control application 1) 200 implementing a CP may store user interaction guides for access token issuance procedures by device type in a database 202. The database 202 may store all of user interaction guides for procedures for issuing the access tokens of A device 220, B device 230, C device 240, and D device 250 based on device types. If the access token issuance procedure of a device is changed according to the type of the device as illustrated in FIG. 1, control application 1 200 which has detected the type of a connected device by the SSDP procedure may provide a user interaction guide to a user.

<Table 1> describes an SSDP procedure, indicating that only information indicating that a connected device is A device can be retrieved.

TABLE 1

HTTP/1.1 200 OK
ST: urn:SmartHomeAlliance-org:device:A_device:1
USN: uuid:abc41940-1a01-4090-8677-abcdef123456::urn:
SmartHomeAlliance-org:device:A_device:1
LOCATION: http://168.219.208.3888889/capability
SERVER: Linux 1.01 SHP/1.1 &#&*/1.0
CACHE-CONTROL: max-age=1800

However, devices of the same type may be further classified according to their user interfaces (UIs), shapes, functions, sizes, and so on. Referring to FIG. 2, A device 220 may be further branched into A-1 device 220-1, A-2 device 220-2, and A-n device 220-*n*. Accordingly, the access token issuance procedure may be different for A-1 device 220-1, A-2 device 220-2, and A-n device 220-*n*. A second control application (control application 2) 210, which wants to control a sub-classified A device, is just aware that a connected device is A device, without further identifying the sub-classification of the A device. Consequently, control application 2 210 may not provide a user interaction guide to the user.

The SSDP procedure may support a limited number of devices and indicate only that a connected device is A device.

In the present disclosure, information indicating the type of a device (for example, A device) may correspond to simple information about the device, and information about the model (model number 1) of the device of the specific type may correspond to detailed information about the device.

Figure 3:
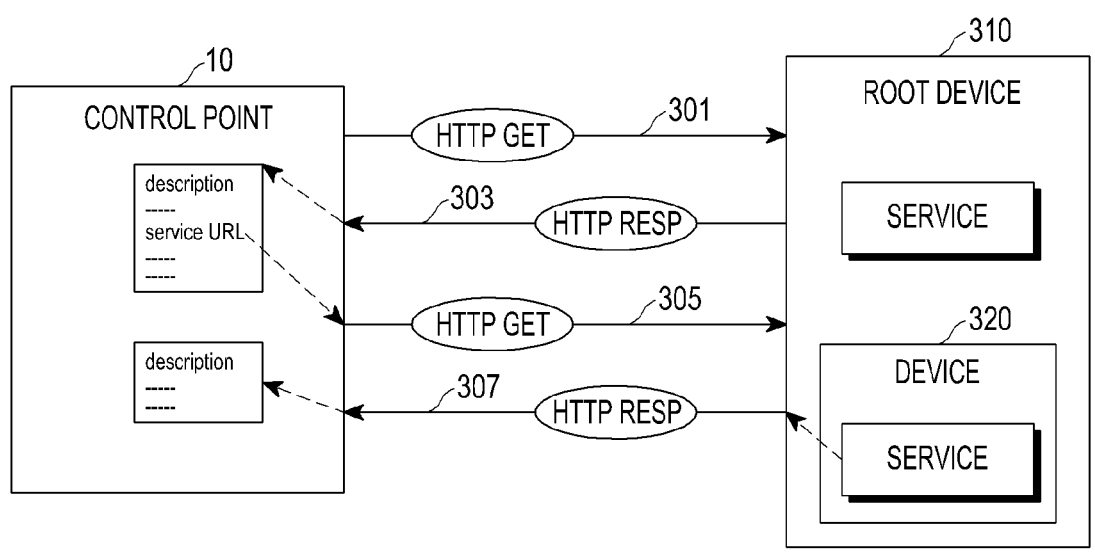
FIG. 3 is a diagram illustrating an example procedure for acquiring detailed information about a device by a control point.

FIG. 3 is a diagram illustrating an example procedure for acquiring detailed information about a device by a CP.

The CP 10 unicasts a hypertext transfer protocol (HTTP) GET request message to a root device 310 in order to acquire detailed information about the root device 310 in operation 301.

Although a root device includes a logical device, the root device may not be included in any logical device. For example, a root device may be a representative device capable of accessing a network. For example, if a refrigerator is a root device, a door, a lamp, and the like of the refrigerator may be logical devices.

The root device 310 transmits its detailed information in a HTTP response message to the CP 10 in operation 303. The root device 310 may also include simple information about another device 320 in the HTTP response message.

The CP 10 may unicast a HTTP GET request message again to the root device 310 to acquire detailed information about the device 320 in operation 305.

The root device 310 may unicast the detailed information about the device 320 in a HTTP response message to the CP 10 in operation 307.

A description will be given of an embodiment for the case where a CP needs detailed information about a device as well as simple information about the device in order to get an access token of the device issued.

In an embodiment of the present disclosure, a device transmits detailed information about the device to a CP by an SSDP procedure. Subsequently, the CP may provide a user interaction guide for an access token issuance procedure of the device to a user based on the detailed information about the device.

Figure 4:
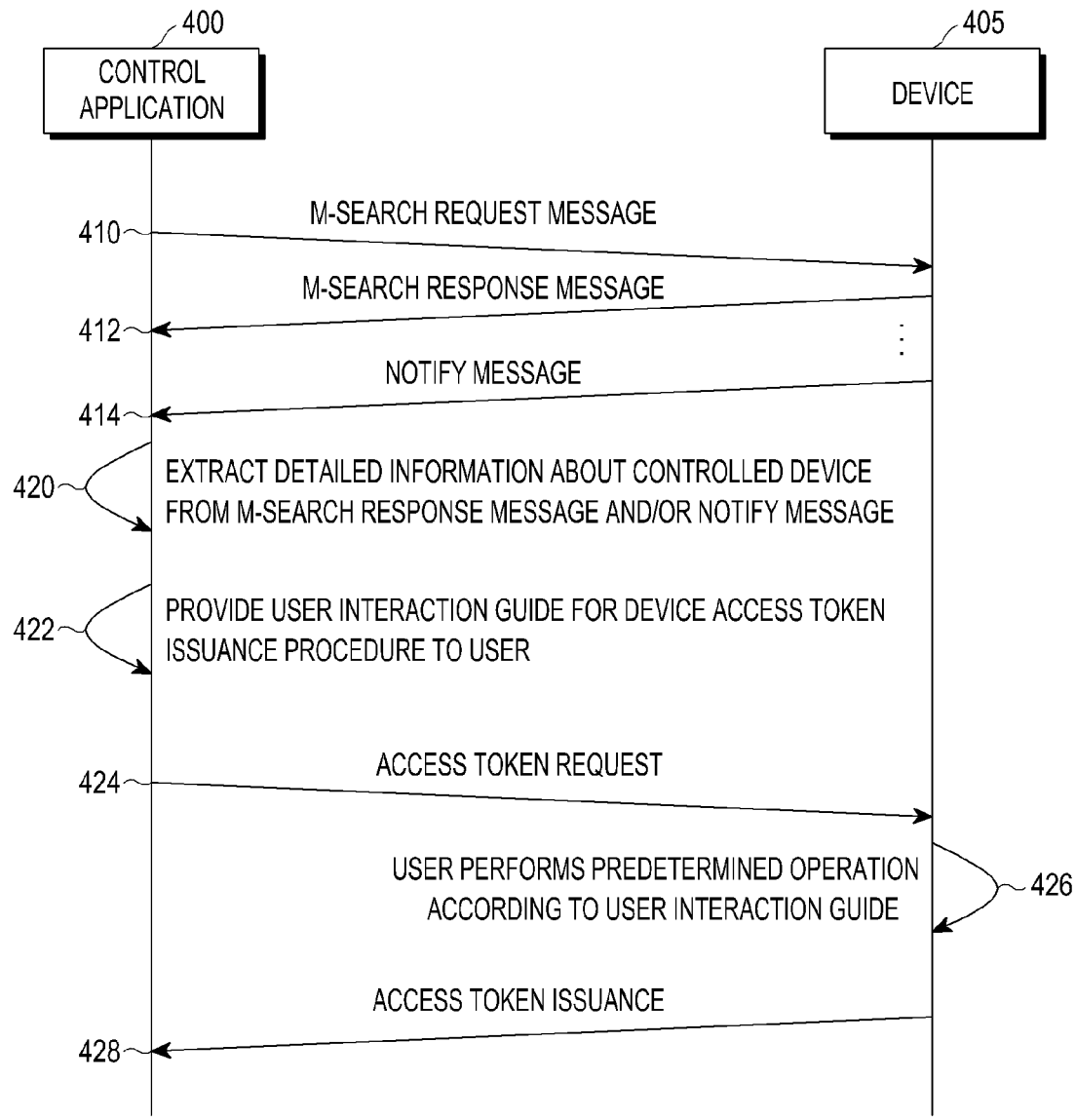
FIG. 4 is a diagram illustrating an example signal flow for an operation for transmitting detailed information about a device to a control point in a simple service discovery protocol (SSDP) procedure by the device according to an example embodiment of the present disclosure.

FIG. 4 is a diagram illustrating an example signal flow for an operation for transmitting detailed information about a device to a CP in an SSDP procedure by the device according to an example embodiment of the present disclosure.

A control application 400 implementing the CP transmits an M-search request message to a device 405 by the SSDP procedure in operation 410.

The device 405 transmits an M-search response message to the control application 400 in response to the M-search request message in operation 412. Alternatively, the device 405 may transmit a notify message to the control application 400 irrespective of the M-search request message in operation 414.

An example of the M-search response message and the notify message may be given as described in <Table 2>.

TABLE 2

HTTP/1.1 200 OK
ST: urn:SmartHomeAlliance-org:device:A_device:1
USN: uuid:abc41940-1a01-4090-8677-abcdef123456::urn:SmartHomeAlliance-org:device:A_device:1
LOCATION: http://168.219.208.38:8889/capability
SERVER: Linux 1.01 SHP/1.1 [A device/1.0 XXX/YY......]
CACHE-CONTROL: max-age=1800

Referring to <Table 2>, detailed information about the device 405, that is, XXX/YY . . . is added to a "SERVER" field of the M-search response message and the notify message.

The control application 400 extracts the detailed information about the device 405 from the M-search response message and/or the notify message in operation 420.

The control application 400 provides a user interaction guide for an access token issuance procedure of the device 405 to a user based on the extracted detailed information about the device 405 in operation 422.

If the user performs an operation according to the user interaction guide, the control application 400 requests an access token to the device 405 in operation 424.

The user performs a predetermined operation according to the user interaction guide to issue the access token of the device 405 to the control application 400 in operation 426. For example, the predetermined operation may be to press a predetermined button of the device 405.

The users of the device 405 and the control application 400 may be identical or different.

The device 405 issues its access token to the control application 400 according to the operation of the user in operation 428. The device 405 may store the detailed information about the device 405, for reuse in the future when needed.

In another embodiment of the present disclosure, in the case where a CP needs detailed information about a device as well as simple information about the device to get an access token of the device issued, the device transmits the detailed information about the device to the CP without the access token. That is, the CP receives the simple information about the device from the device in the SSDP procedure. Then, the CP receives the detailed information about the device using resources accessible without using the access token of the device, based on the simple information about the device.

Figure 5:
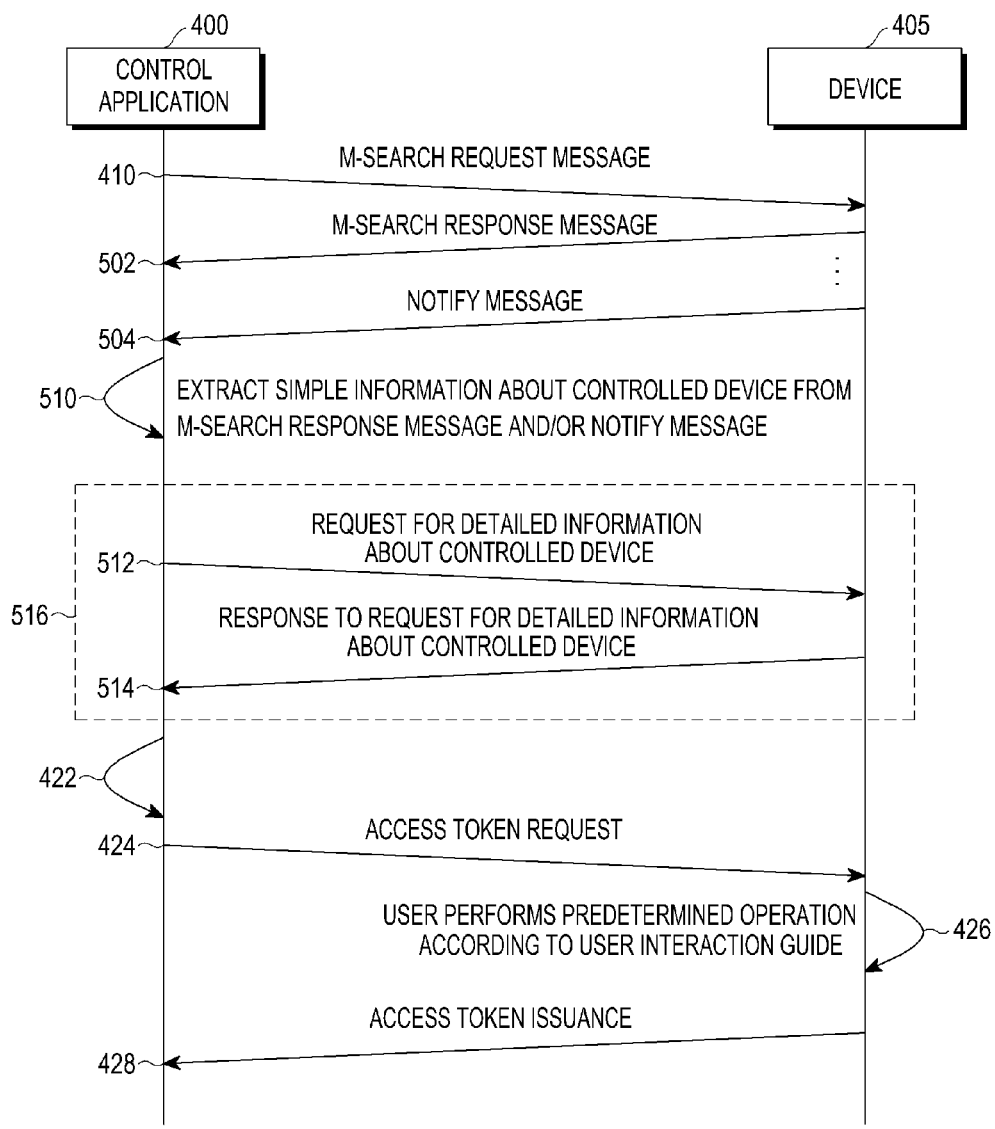
FIG. 5 is a diagram illustrating an example signal flow for an operation for providing detailed information about a device to a control point, using resources accessible without an access token of the device by the device according to another example embodiment of the present disclosure.

FIG. 5 is a diagram illustrating an example signal flow for an operation for providing detailed information about a device to a CP, using resources accessible without an access token of the device by the device according to another example embodiment of the present disclosure.

Like reference numerals in FIGS. 4 and 5 denote the same or similar operations.

The control application 400 transmits an M-search request message to the device 405 by the SSDP procedure in operation 410.

The device 405 transmits an M-search response message to the control application 400 in response to the M-search request message in operation 502.

Selectively, the device 405 may transmit a notify message to the control application 400 irrespective of the M-search request message in operation 504.

An example of the M-search response message and the notify message may be configured as illustrated in <Table 3>.

TABLE 3

HTTP/1.1 200 OK
ST: urn:SmartHomeAlliance-org:device:A_device:1
USN: uuid:abc41940-1a01-4090-8677-abcdef123456::urn:SmartHomeAlliance-org:device:A_device:1
LOCATION: http://168.219.208.38:8889/capability
SERVER: Linux 1.01 SHP/1.1 SIMPLE_DEVICE_INFO/1.0
CACHE-CONTROL: max-age=1800

Referring to <Table 3>, the M-search response message and the notify message include simple information about the device 405, that is, "SIMPLE_DEVICE_INFO/1.0" without detailed information about the device 405.

The control application 400 extracts the detailed information about the device 405 from the M-search response message and/or the notify message in operation 510.

The control application 400 requests detailed information about the device 405 to the device 405 based on the extracted simple information about the device 405 in operation 512.

The device 405 transmits a response to the request to the control application 400 in operation 514.

The request for detailed information about the device 405 and the response to the request may be transmitted in resources accessible without using the access token of the device 405 in operation 516.

Operations 422 to 428 in FIG. 5 are performed in the same or similar manner as their counterparts in FIG. 4 and thus will not be further described herein.

Figure 6A:
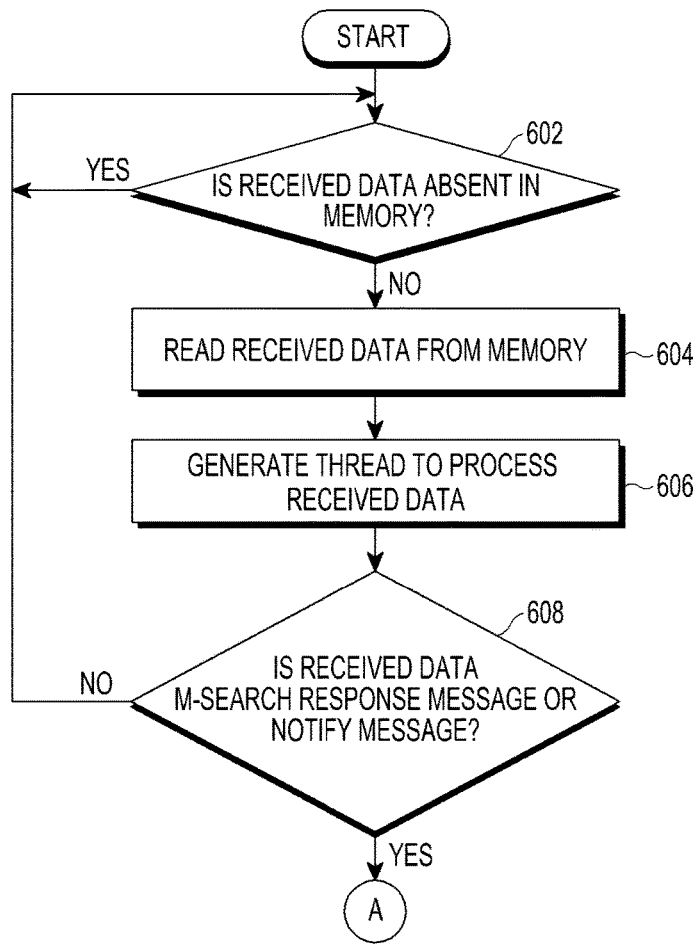
FIGS. 6A, 6B, and 6C are flowcharts illustrating an example operation of a control application according to an example embodiment of the present disclosure.
Figure 6B:
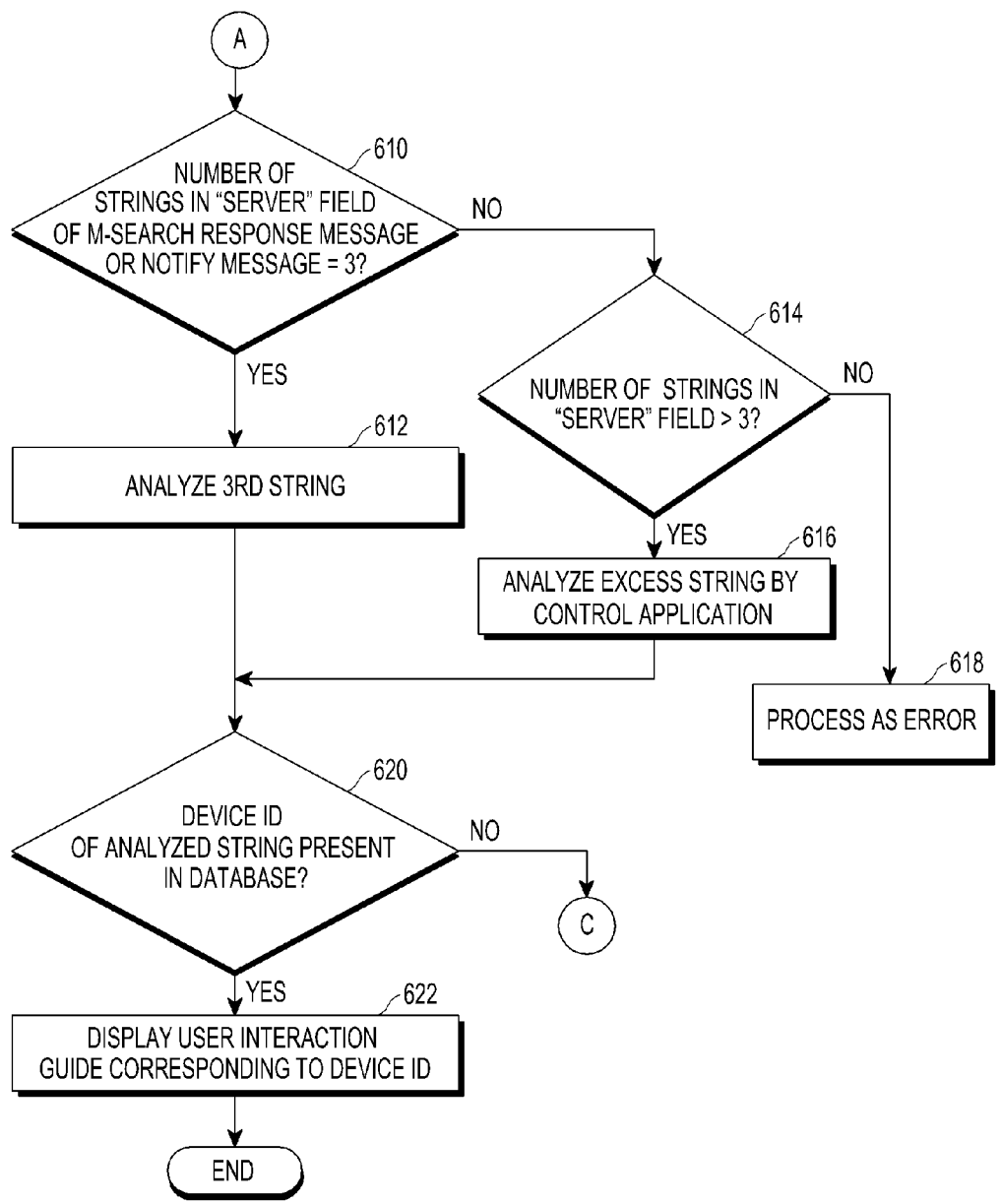
Figure 6C:
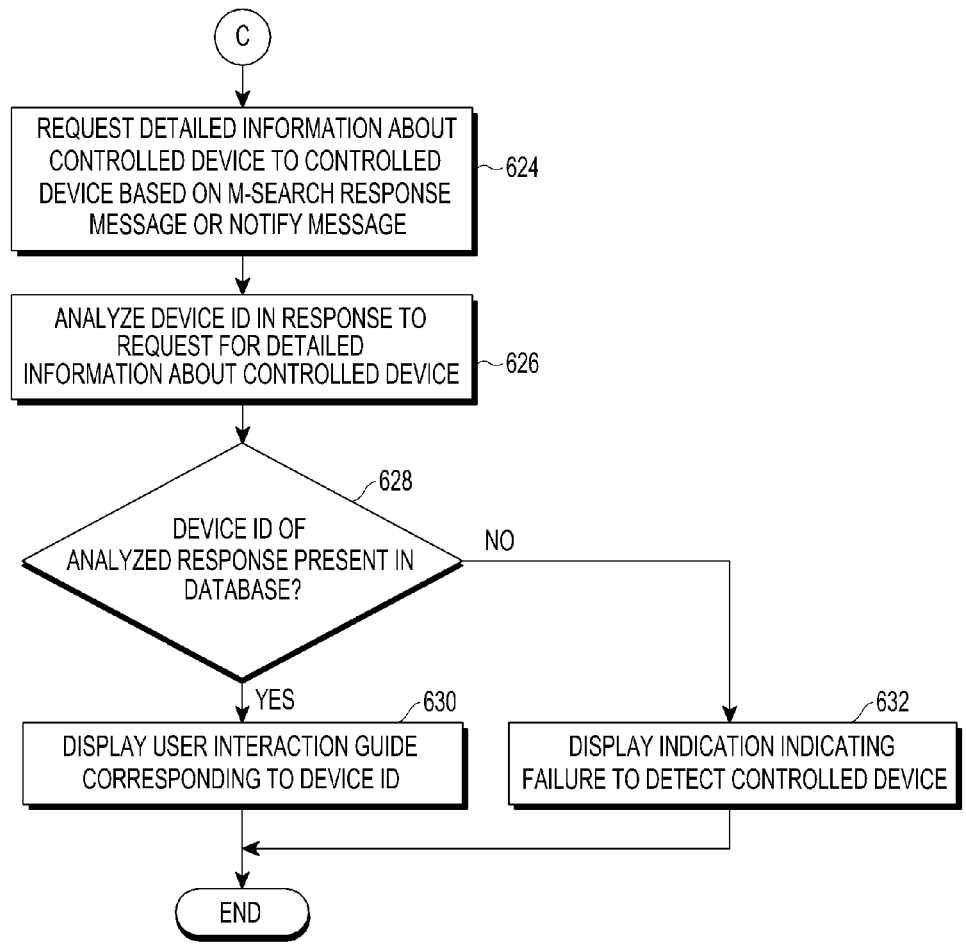

FIGS. 6A, 6B, and 6C are flowcharts illustrating an example operation of a control application according to an example embodiment of the present disclosure.

The control application determines whether there are received data in a memory (for example, a queue) in operation 602.

In the presence of received data, the control application reads the received data from the memory in operation 604.

The control application generates a thread to process the received data in operation 606.

The control application determines whether the received data are an M-search response message or a notify message in operation 608.

The control application determines whether the number of strings in the "SERVER" field of the M-search response message or the notify message is 3 in operation 610.

If the number of strings in the "SERVER" field is 3, the control application analyzes a third string in operation 612.

On the other hand, if the number of strings in the "SERVER" field is not 3, the control application determines whether the number of strings in the "SERVER" field exceeds 3 in operation 614.

If the number of strings in the "SERVER" field exceeds 3, the control application analyzes an excess string in operation 616. However, if the number of strings in the "SERVER" field does not exceed 3, that is, if the number of strings in the "SERVER" field is equal to or less than 2, the control application processes the received data as an error in operation 618.

The control application determines whether a device identification (ID) included in the analyzed string exists in a database in operation 620. The device ID may be information about the model of the device. User interaction guides corresponding to device IDs are stored in the database.

In the presence of the device ID in the database, the control application displays a user interaction guide corresponding to the device ID in operation 622.

On the contrary, in the absence of the device ID in the database, the control application requests detailed information about the device, to the device based on the M-search response message or the notify message in operation 624.

Upon receipt of a response to the request for the detailed information about the device, the control application analyzes a device ID included in the response in operation 626.

The control application determines whether the device ID of the response exists in the database in operation 628.

In the presence of the device ID, the control application displays a user interaction guide corresponding to the device ID in operation 630.

On the contrary, in the absence of the device ID in the database, the control application displays a message indicating failure to detect the device in operation 632.

Figure 7:
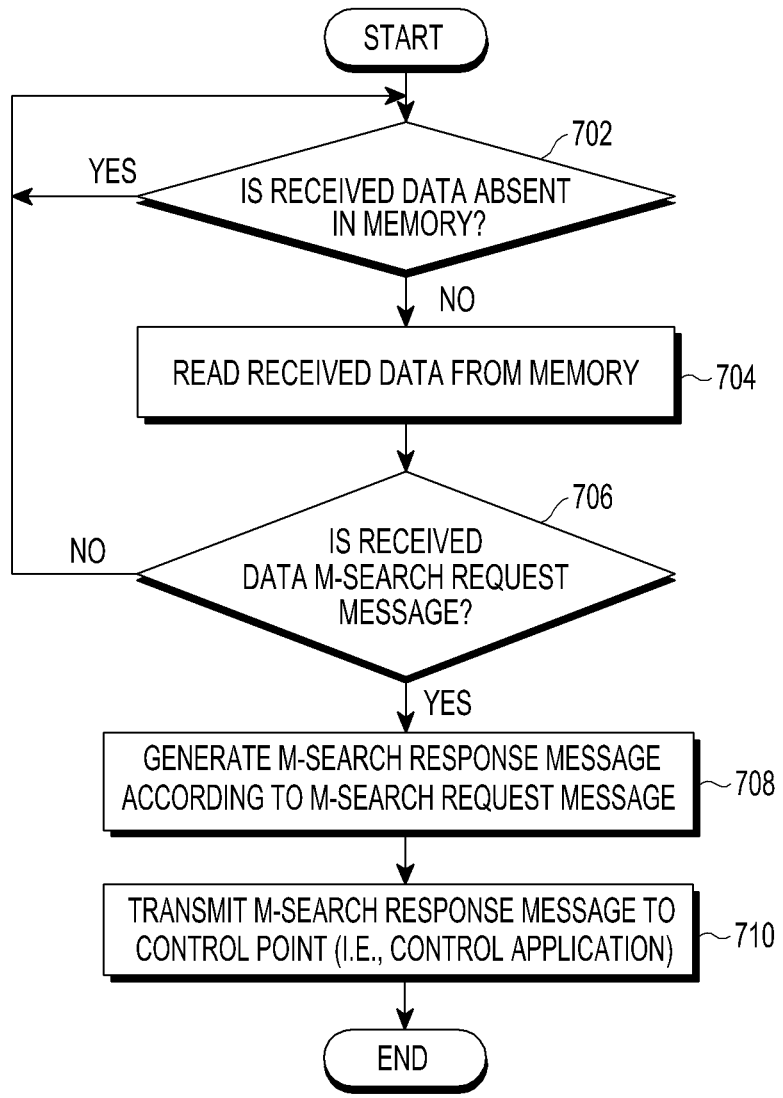
FIG. 7 is a flowchart illustrating an example operation of a device for including detailed information about the device in a Method-search (M-search) response message and a notify message in an SSDP procedure according to an example embodiment of the present disclosure.

FIG. 7 is a flowchart illustrating an example operation of a device for including detailed information about the device in an M-search response message and a notify message in an SSDP procedure according to an example embodiment of the present disclosure.

The device determines whether there are received data in a memory (for example, a queue) in operation 702.

In the presence of received data, the device reads the received data from the memory in operation 704.

The device determines whether the received data are an M-search request message in operation 706.

If the received data are an M-search request message, the device generates an M-search response message according to the M-search request message in operation 708. In the embodiment, the M-search request message includes a request for detailed information about the device. Therefore, the device generates an M-search response message including the detailed information about the device.

The device transmits the M-search response message to the CP (that is, the control application) in operation 710.

Figure 8:
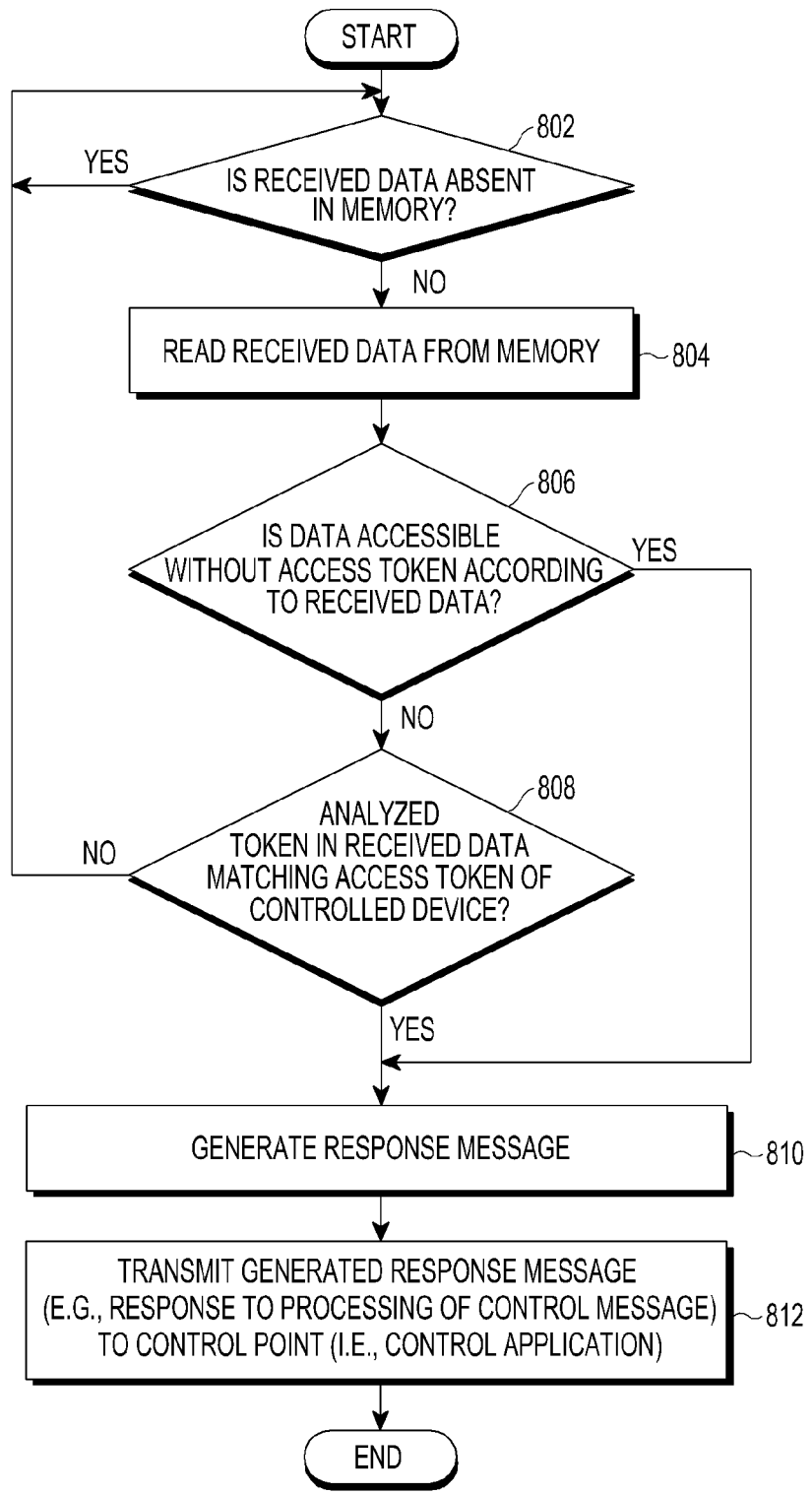
FIG. 8 is a flowchart illustrating an example operation of a device for providing detailed information about the device to a control point, using resources accessible without an access token of the device according to another example embodiment of the present disclosure.

FIG. 8 is a flowchart illustrating an example operation of a device for providing detailed information about the device to a CP in resources accessible without an access token of the device according to another example embodiment of the present disclosure.

The device determines whether there are received data in a memory (for example, a queue) in operation 802. In the presence of received data, the device reads the received data from the memory in operation 804.

The device determines whether resources are accessible without an access token according to the received data in operation 806.

If the resources are not accessible, the device determines whether an access token analyzed in the received data matches the access token of the device in operation 808.

If the access tokens match each other or the resources are accessible without an access token, the device generates a response message in operation 810.

The device transmits the generated response message to the CP (that is, the control application) in operation 812.

Figure 9:
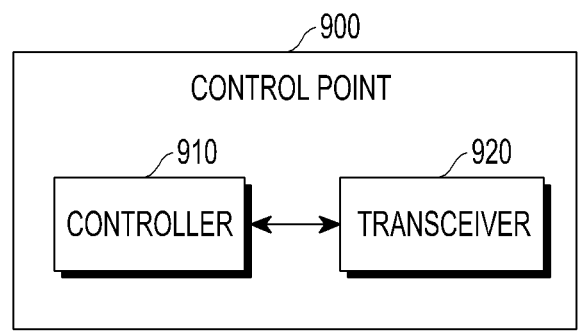
FIG. 9 is a block diagram illustrating an example client device with the functionality of a control point implemented as a control application according to an example embodiment of the present disclosure.

FIG. 9 is a block diagram illustrating an example client device with the functionality of a CP implemented as a control application according to an example embodiment of the present disclosure.

A client device 900 may include a transceiver 920 including, for example, various circuitry for transmitting and receiving data or messages to and from a device, and a controller (e.g., including processing circuitry) 910 for controlling the transceiver 920.

It may be interpreted that the controller 910 performs operations related to a control application implementing the afore-described functionality of a CP. For example, the controller 910 may be configured to analyze a string in the "SERVER" field of an M-search response message or a notify message.

While the transceiver 920 and the controller 910 are illustrated as being separately configured to aid in understanding, the transceiver 920 and the controller 910 may be incorporated into a single component.

Figure 10:
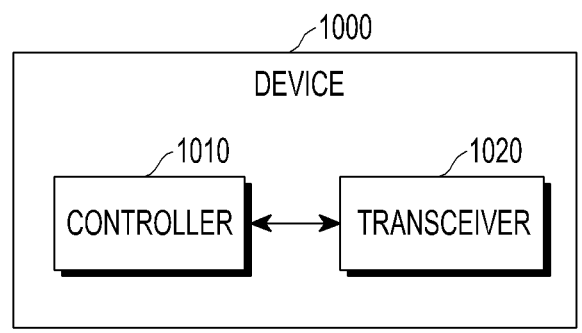
FIG. 10 is a block diagram illustrating an example device (for example, a washing machine or a refrigerator) according to an example embodiment of the present disclosure.

FIG. 10 is a block diagram illustrating an example device (for example, a washing machine or a refrigerator) according to an example embodiment of the present disclosure.

A device 1000 may include a transceiver 1020 including, for example, various circuitry for transmitting and receiving data or messages to and from a client device, and a controller (e.g., including processing circuitry) 1010 for controlling the transceiver 1020.

It may be interpreted that the controller 1010 performs operations related to the afore-described functionality of a CP. For example, the controller 1010 may be configured to generate an M-search response message including detailed information about the device 1000.

While the transceiver 1020 and the controller 1010 are illustrated as being separately configured to aid in understanding, the transceiver 1020 and the controller 1010 may be incorporated into a single component.

As is apparent from the foregoing description of various example embodiments, according to the present disclosure, a CP can get an access token of a device issued irrespective of the type of the device.

According to the present disclosure, the CP can get even an access token of a device whose detailed information is required for access token issuance.

The example embodiments disclosed herein are provided for description and understanding of the present disclosure, not limiting the scope of the present disclosure. Accordingly, the scope of the present disclosure should be interpreted as embracing all modifications or various embodiments within the scope of the present disclosure therein.

What is claimed is:

1. A method for issuing an access token of a device by a control device, the method comprising:

transmitting a request message to the device;
receiving, from the device, a response message including first information indicating a type of the device;
identifying a user interaction guide corresponding to the first information, and second information including model information about the device;
displaying the identified user interaction guide for the issuance of the access token;
in response to a user input through the displayed user interaction guide, requesting an issuance of the access token being needed for access of the device, to the device; and
receiving the access token from the device.

2. The method of claim 1, wherein the response message further includes the second information.

3. The method of claim 2, wherein the response message is at least one of an M-search response message and a notify message, and
wherein the second information is added to a "SERVER" field of the M-search response message or the notify message.

4. The method of claim 1, further comprising:
transmitting a message requesting the second information, to the device using the first information; and
receiving a response message including the second information.

5. The method of claim 1, wherein the displaying step comprises:
determining whether there is the user interaction guide for a model of the device corresponding to the model information in a database of the control device; and
if the user interaction guide is present, displaying the user interaction guide.

6. A method for issuing an access token by a device, the method comprising:
receiving, from a control device, a request message requesting a search for the device;
transmitting, to the control device, a response message including first information indicating a type of the device;
receiving, from the control device, a request for issuing the access token of the device using the first information and second information; and
issuing the access token of the device, if the request for issuing the access token of the device is received in response to a user input through a user interaction guide displayed by the control device, which is identified corresponding to the first information and second information including model information about the device.

7. The method of claim 6, wherein the response message further includes the second information.

8. The method of claim 7, wherein the response message is at least one of an M-search response message and a notify message, and
wherein the second information is added to a "SERVER" field of the M-search response message or the notify message.

9. The method of claim 6, further comprising:
receiving a message requesting the second information; and
transmitting a response message including the second information.

10. An apparatus for getting an access token of a device issued, the apparatus comprising:
a transceiver configured to transmit and receive messages; and
a controller configured to control transmission of a request message to the device, to control reception of a response message including first information indicating a type of the device from the device, to control
identifying a user interaction guide corresponding to the first information and second information including model information about the device, display the identified user interaction guide for the issuance of the access token, and in response to a user input through the displayed user interaction guide, requesting of an issuance of the access token being needed for access of the device to the device.

11. The apparatus of claim 10, wherein the response message further includes the second information.

12. The apparatus of claim 11, wherein the response message is at least one of an M-search response message and a notify message, and
wherein the second information is added to a "SERVER" field of the M-search response message or the notify message.

13. The apparatus of claim 10, wherein the controller is configured to control transmission of a message requesting the second information, to the device using the first information, and to receive a response message including the second information.

14. The apparatus of claim 10, wherein the controller is configured to determine whether there is the user interaction guide for a model of the device corresponding to the model information in a database of the apparatus, and if the user interaction guide is present, to display the user interaction guide.

15. A device for issuing an access token, the device comprising:
a transceiver configured to transmit and receive messages; and
a controller configured to control reception of a request message requesting a search for the device, from a control device, to control transmission of a response message including first information indicating a type of the device to the control device, to control reception of a request for issuing the access token of the device using the first information and second information, from the control device, and to control issuance of the access token of the device, if the request for issuing the access token of the device is received in response to a user input through a user interaction guide displayed by the control device, which is identified corresponding to the first information and second information including model information about the device.

16. The device of claim 15, wherein the response message further includes the second information.

17. The device of claim 16, wherein the response message is at least one of an M-search response message and a notify message, and
wherein the second information is added to a "SERVER" field of the M-search response message or the notify message.

18. The device of claim 15, wherein the transceiver is configured to receive a message requesting the second information, and to transmit a response message including the second information.

* * * * *